United States Patent
Hirano

(10) Patent No.: US 12,242,219 B2
(45) Date of Patent: Mar. 4, 2025

(54) IMAGE FORMING APPARATUS AND ELECTRONIC DEVICE CONNECTED TO THE IMAGE FORMING APPARATUS SWITCHING POWER SUPPLY BASED ON OPERATING MODE OF THE IMAGE FORMING APPARATUS

(71) Applicant: CANON KABUSHIKI KAISHA, Tokyo (JP)

(72) Inventor: Yuya Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/047,352

(22) Filed: Oct. 18, 2022

(65) Prior Publication Data
US 2023/0117622 A1    Apr. 20, 2023

(30) Foreign Application Priority Data
Oct. 20, 2021   (JP) .................................. 2021-171412

(51) Int. Cl.
G03G 15/20 (2006.01)
G03G 15/00 (2006.01)
G06K 15/00 (2006.01)

(52) U.S. Cl.
CPC ......... *G03G 15/80* (2013.01); *G03G 15/2039* (2013.01); *G06K 15/4055* (2013.01)

(58) Field of Classification Search
CPC . G03G 15/2039; G03G 15/80; G06K 15/4055
USPC .......................................................... 399/69
See application file for complete search history.

(56) References Cited

U.S. PATENT DOCUMENTS

| | | | |
|---|---|---|---|
| 6,256,464 B1 * | 7/2001 | Sumiyoshi | G03G 15/5004 399/88 |
| 10,536,085 B2 | 1/2020 | Hirano | |
| 11,079,832 B2 | 8/2021 | Hirano | |
| 11,487,235 B2 | 11/2022 | Hirano | |
| 2014/0192574 A1 * | 7/2014 | Nozaki | G03G 15/5004 399/88 |

(Continued)

FOREIGN PATENT DOCUMENTS

| | | |
|---|---|---|
| JP | H09-50211 A | 2/1997 |
| JP | 2000-267518 A | 9/2000 |

(Continued)

*Primary Examiner* — Quana Grainger
(74) *Attorney, Agent, or Firm* — VENABLE LLP

(57) ABSTRACT

A device includes an operating portion, a switch and a controller. The device is operable in a first mode in which a predetermined operation is executed and in a second mode of which power consumption is reduced rather than in the first mode, and operates in a state connected to an image forming apparatus. The operating portion operates by an AC voltage supplied from an external power source. The switch supplies the AC voltage to the operating portion in a conductive state and cuts off supply of the AC voltage to the operating portion in a non-conductive state. The controller operates by a DC voltage generated from the AC voltage by a power source provided in the image forming apparatus. The controller controls to cause the switch to be in the non-conductive state so as to stop operation of the operating portion when the device shifts from the first mode to the second mode.

8 Claims, 3 Drawing Sheets

(56) References Cited

U.S. PATENT DOCUMENTS

2022/0368806 A1  11/2022  Hirano

FOREIGN PATENT DOCUMENTS

| | | |
|---|---|---|
| JP | 2005-241707 A | 9/2005 |
| JP | 2016-163951 A | 9/2016 |

* cited by examiner

IMAGE FORMING APPARATUS AND ELECTRONIC DEVICE CONNECTED TO THE IMAGE FORMING APPARATUS SWITCHING POWER SUPPLY BASED ON OPERATING MODE OF THE IMAGE FORMING APPARATUS

FIELD OF THE INVENTION AND RELATED ART

The present invention relates to a device, an image forming apparatus and an electronic device, and, for example, relates to a technology that reduces power consumption in the energy saving mode of the device (especially, as an option device), provided with a heating device with an incorporated heater, and the image forming apparatus.

Conventionally, a printer system is provided with an option device and an image forming apparatus to which the option device is connected. Such printer systems propose a method in which the option device is provided with a heating device with an incorporated heater to output the optimal printed material for the user's purpose while suppressing the cost of the image forming apparatus and the installation area (see, for example, Japanese Laid-Open Patent Application 2005-241707).

Subject the Invention Seeks to Solve

However, an issue arises wherein a heater driving circuit, which drives the heater incorporated in the heating device, generates standby power even when the drive operation of the heater is in a stopped state. Therefore, further reduction of power consumption in the energy saving mode is required.

The present invention was created under such conditions, and its purpose is to reduce power consumption of the option device in the energy saving mode.

SUMMARY OF THE INVENTION

In order to resolve the issue described above, the present invention provides the following configuration.

(1) According to an aspect of the present invention, there is provided a device operable in a first mode in which a predetermined operation is executed and in a second mode of which power consumption is reduced rather than in the first mode, and operating in a state connected to an image forming apparatus configured to form an image onto a recording material, the device comprising: an operating portion configured to operate by an AC voltage supplied from an external power source; a first switching portion configured to supply the AC voltage to the operating portion in a conductive state and to cut off supply of the AC voltage to the operating portion in a non-conductive state; and a control portion configured to operate by a DC voltage generated from the AC voltage by a power source portion provided in the image forming apparatus, wherein the control portion controls to cause the first switching portion to be in the non-conductive state so as to stop operation of the operating portion when the device shifts from the first mode to the second mode.

(2) According to another aspect of the present invention, there is provided an image forming system comprising: an image forming apparatus configured to form an image onto a recording material; a device operating in a state connected to the image forming apparatus, wherein the image forming apparatus and the device are operable in a first mode in which a predetermined operation is executed and in a second mode of which power consumption is reduced rather than in the first mode, wherein the image forming apparatus includes a power source portion configured to generate a DC voltage from an AC voltage supplied from an external power source, and wherein the device includes an operating portion configured to operate by the AC voltage; a first switching portion configured to supply the AC voltage to the operating portion in a conductive state and to cut off supply of the AC voltage to the operating portion in a non-conductive state; and a control portion configured to operate by the DC voltage generated by the power source portion, wherein the control portion controls to cause the first switching portion to be in the non-conductive state so as to stop operation of the operating portion when the device shifts from the first mode to the second mode.

(3) According to another aspect of the present invention, there is provided an electronic device operable in a first mode in which a predetermined operation is executed and in a second mode of which power consumption is reduced rather than in the first mode, and operating in cooperation with another electronic device including a power source portion, the electronic device comprising: an operating portion configured to operate by an AC voltage supplied from an external power source; a switching portion configured to supply the AC voltage to the operating portion in a conductive state and to cut off supply of the AC voltage to the operating portion in a non-conductive state; and a control portion configured to operate by a DC voltage generated from the AC voltage by the power source portion provided in the another electronic device, wherein the control portion controls to cause the switching portion to be in the non-conductive state so as to stop operation of the operating portion when the device shifts from the first mode to the second mode.

Further features of the present invention will become apparent from the following description of exemplary embodiments with reference to the drawings.

DESCRIPTION OF THE EMBODIMENTS

In the following, embodiments of the present invention will be specifically described with reference to Figures.

Embodiment 1

Printer System

Printer

Figure 1:
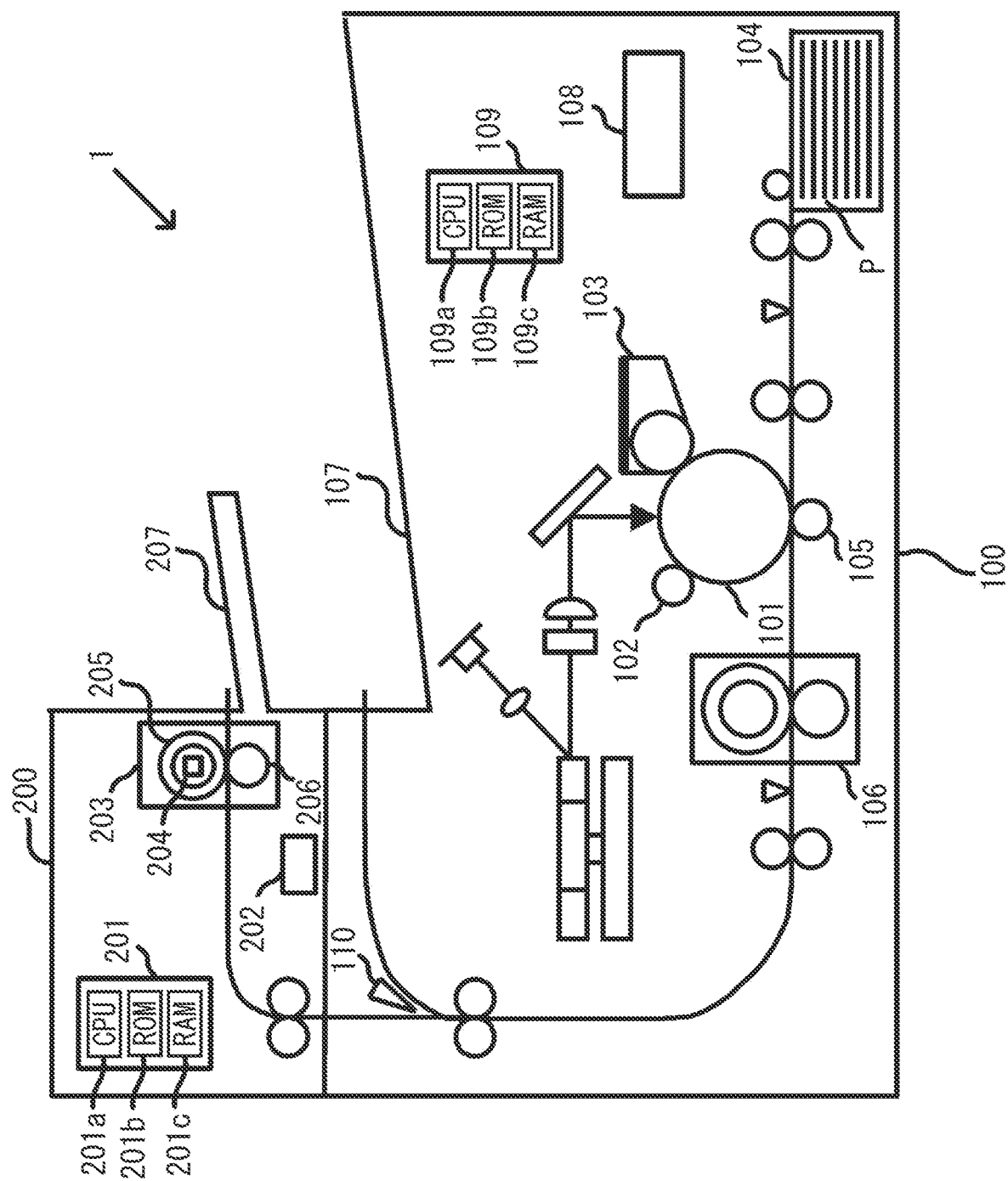
FIG. 1 is a schematic configuration view of a printer system of embodiments 1 and 2.

FIG. 1 shows an example of the schematic configuration of an image fixing apparatus and an option device provided by a printer system 1, which is an image forming system of the embodiment 1. A laser beam printer 100 (hereinafter referred to as "printer 100") provides a photosensitive drum 101, a charging portion 102 and a developing portion 103. The photosensitive drum 101 is an image bearing member in which an electrostatic latent image is formed. The charging portion 102 uniformly charges the photosensitive drum 101. The developing portion 103 forms a toner image by developing an electrostatic latent image formed by the photosensitive drum 101 with toner. The toner image formed above the photosensitive drum 101 (above the image bearing member) is transferred by a transfer portion 105 to a sheet P, a recording material which is supplied from a cassette 104, and an unfixed toner image which has been transferred to the sheet P is fixed by a fixing device 106. The photosensitive drum 101, the charging portion 102, the developing portion 103 and the transfer portion 105 comprise an image forming portion. The fixed sheet P is discharged to a tray 107 or to a discharge option device 200 (hereinafter referred to as "option 200") by a flapper 110 which switches the discharge destination of the sheet P. Further, the printer 100 provides a power source device 108, and the power source device 108 supplies power to a control portion 201 described below, which is included in the printer 100 and the option 200. A control portion 109 includes a CPU 109a, a ROM 109b and a RAM 109c. The CPU 109a follows various programs stored in the ROM 109b and controls an image forming operation by the image forming portion and feeding operation of the sheet P, etc. while using the RAM 109c as a working area.

Option

The option 200 is connected to the printer 100 and discharges the sheet P, which has been fed from the printer 100, to a tray 207. Further, the option 200 is provided with the control portion 201, a driving circuit portion 202 and a heating portion 203 with an incorporated heater portion 204. The driving circuit portion 202 controls the power supplied into the heater portion 204 which is incorporated in the heating portion 203. The control portion 201 includes a CPU 201a, a ROM 201b and a RAM 201c. The CPU 201a follows various programs stored in the ROM 201b and controls a feeding operation of the sheet P and an operation of the driving circuit portion 202, etc. inside the option 200 while using the RAM 201c as a working area. The heating portion 203 includes the incorporated heater portion 204, a fixing roller 205 which transmits heat from the heater portion 204 and a pressing roller 206 which forms a nip portion with the fixing roller 205. Using the heater portion 204, the fixing roller 205 and the pressing roller 206, the heating portion 203 feeds the sheet P to the tray 207 while adjusting the glossiness, etc. of the sheet P by heating and pressing the sheet P which has been fed from the printer 100. Incidentally, the image forming apparatus to which the option device of this invention can be applied is not limited to the configuration illustrated in FIG. 1.

Circuit Configuration of Printer System

Figure 2:
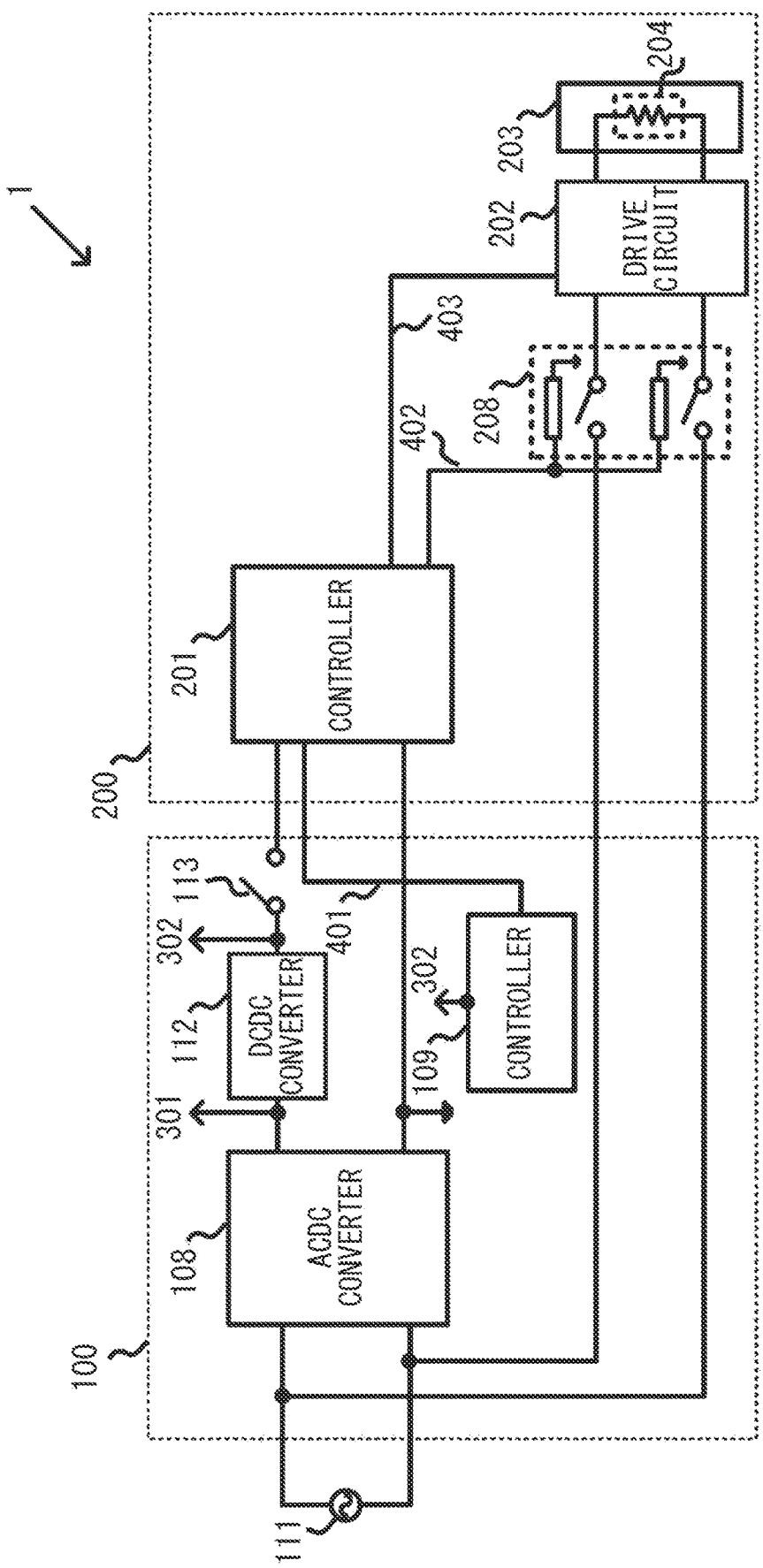
FIG. 2 is a circuit configuration view of a printer and an option of the embodiment 1.

FIG. 2 shows the circuit configuration view of the printer 100 and the option 200 of the embodiment 1. An AC voltage inputted from an AC source 111 is inputted into the power source device 108 of the printer 100 and the option 200. The power source device 108 is an ACDC converter and converts the inputted AC voltage into a DC voltage 301. The power source device 108 is hereinafter referred to as "ACDC converter 108". The DC voltage 301 is supplied to a motor, etc. of a driving portion (not shown in FIG. 2) of the printer 100 while also being supplied to a DCDC converter 112. The ACDC converter 108 and the DCDC converter 112 are included in a power source portion provided by the image forming apparatus. The DCDC converter 112 is a step-down DCDC converter and converts the inputted DC voltage 301 into a DC voltage 302 which is a lower voltage than the DC voltage 301. The DC voltage 302 is supplied to the control portion 109 while also being supplied to the control portion 201 of the option 200. That is, the control portion 109 operates by the DC voltage generated by the power source portion provided by the image forming apparatus. A switch 113 is connected to the line which supplies the DC voltage 302 to the control portion 201. The switch 113 supplies the DC voltage 302 to the control portion 201 in a closed state and cuts off supply of the DC voltage 302 to the control portion 201 in an open state. The control portion 109 controls the switching of the open state and the closed state of the switch 113. The control portion 109 communicates with the control portion 201 via a signal line 401.

The AC voltage inputted into the option 200 is connected to the driving circuit portion 202 (driving circuit) via a relay 208. The driving circuit portion 202 is an operating portion that operates by the supplied AC voltage. The control portion 201 sends a signal to the relay 208 via a signal line 402 and controls the conduction and non-conduction of the relay 208 so as to control the relay 208. In a case that the relay 208 is conductive, the AC voltage is inputted into the driving circuit portion 202. The relay 208 is a first switching portion which supplies the AC voltage to the operating portion in a conductive state and cuts off supply of the AC voltage to the operating portion in a non-conductive state. The driving circuit portion 202 is a switching circuit which provides a bidirectional thyristor (hereinafter referred to as "triac"), etc. and supplies power to the heater portion 204 included in the heating portion 203 by the switching operation of the AC voltage inputted into the driving circuit portion 202. The control portion 201 sends a signal to the driving circuit portion 202 via a signal line 403 so as to control the switching operation of the driving circuit portion 202. The control portion 201 controls the power supplied into the heater portion 204 via the signal line 403 so as to control the temperature of the heater portion 204 to a predetermined value.

The printer 100 and the option 200 are operable in three modes; for example, a print mode that executes a print operation, a standby mode that stands by in a state in which the print operation can be executed immediately and an energy saving mode in which the printer 100 and the option 200 stand by in a low power consumption state. Here, the print mode and the standby mode comprise a first mode which executes a predetermined operation. The energy saving mode is a second mode of which power consumption is reduced rather than in the first mode. The control portion 109 and the control portion 201 cause the printer 100 and the option 200 to transition to their respective modes based on the state of the printer 100 and the option 200, instructions from the user, etc.

In a case that the printer 100 receives a print instruction from the user, the control portion 109 switches the printer 100 to the print mode while sending a print instruction to the control portion 201 via the signal line 401. Upon receiving the print instruction, the control portion 201 causes the option 200 to transition to the print mode. After the print operation is completed and a predetermined time has elapsed, the control portion 109 and the control portion 201 cause the printer 100 and the option 200 to transition to the standby mode. After the printer 100 and the option 200 have been transitioned to the standby mode and a predetermined time has further elapsed, the control portion 109 and the control portion 201 check the state of the printer 100 and the option 200. In a case that the control portion 109 and the control portion 201 determine that no errors, etc. have occurred and that the printer 100 and the option 200 can be shifted to the energy saving mode, the control portion 109 and the control portion 201 cause the state of the printer 100 and the option 200 to transition to the energy saving mode.

Once the control portion 109 has caused the printer 100 to transition to the energy saving mode, the control portion 109 cuts off the DC voltage 301 supplied to the motor, etc. of the driving portion of the printer 100 using a load switch (not shown in FIG. 2) so as to reduce the power consumed in the printer 100. Once the control portion 201 has caused the option 200 to transition to the energy saving mode, the control portion 201 switches the relay 208 to be non-conductive via the signal line 402.

In a case that the relay 208 is in the conductive state, standby power continues to be generated by internal resistance in the driving circuit portion 202, in capacitor (not shown in FIG. 2) between AC lines, etc. even if the switching operation of the driving circuit portion 202 has been caused to stop. Therefore, when the control portion 201 transitions to the energy saving mode, the control portion 201 switches the relay 208 to be non-conductive so as to cut off the supply itself of the AC voltage to the driving circuit portion 202. In this way, when the control portion 201 shifts from the standby mode to the energy saving mode, it causes the relay 208 to be in the non-conductive state so as to stop operation of the driving circuit portion 202. As a result, power consumption generated on the load side of the relay 208, including the standby power generated in the driving circuit portion 202, can be reduced.

In the embodiment 1, the relay 208 is further provided by the option 200 and the control portion 201 controls the relay 208. As a result, the cost of the printer 100 can be reduced with respect to a case in which a relay is provided by the printer 100, or with respect to a configuration in which the control portion 109 of the printer 100 controls the relay 208 of the option 200. Incidentally, in order to realize further energy conservation in the option 200, the control portion 109 can cause the switch 113 to be in an open state so as to cut off supply of the DC voltage 302 to the control portion 201.

As described above, according to the embodiment 1, the control portion 201 causes the relay 208 to be non-conductive in the energy saving mode so as to reduce power consumption generated on the load side of the relay 208. As a result, power consumption of the option 200 and the printer system 1 can be reduced while suppressing the cost increase of the printer 100. Incidentally, in the embodiment 1, the relay 208 can be configured with a triac, etc. or another switch component. Further, the transition of the option 200 to the energy saving mode may be controlled to cause the option 200 to transition to the energy saving mode when the control portion 201 receives instruction from the control portion 109 via the signal line 401 to shift to the energy saving mode.

Further, the device to which the present invention is applied is not limited to the option device. For example, the present invention can be applied to an electronic device operable in a first mode in which a predetermined operation is executed and in a second mode of which power consumption is reduced rather than in the first mode. This electronic device operates in cooperation with another electronic device including a power source portion. This electronic device comprises an operating portion, a switching portion and a control portion. The operating portion operates by a supplied AC voltage. The switching portion supplies the AC voltage to the operating portion in the conductive state and cuts off supply of the AC voltage to the operating portion in the non-conductive state. The control portion operates by a DC voltage generated by the power source portion included in the other electronic device so as to control the switching portion. The control portion of the electronic device provided with this configuration causes the switching portion to be in the non-conductive state when the electronic device shifts from the first mode to the second mode so as to stop operation of the operating portion. As a result, power consumption of the electronic device in the second mode can be reduced. Here, the option device described above corresponds to the electronic device and the image forming apparatus corresponds to the another electronic device.

As described above, according to the embodiment 1, power consumption of the option device in the energy saving mode can be reduced.

Embodiment 2

Circuit Configuration of Printer System

The printer system 1 of the embodiment 2 will be described. Descriptions of the main aspects are the same as for the embodiment 1, so the same reference numerals will be used and descriptions will be omitted for configurations which are the same configurations as for the embodiment 1. Here, only aspects which differ from the embodiment 1 will be described.

Figure 3:
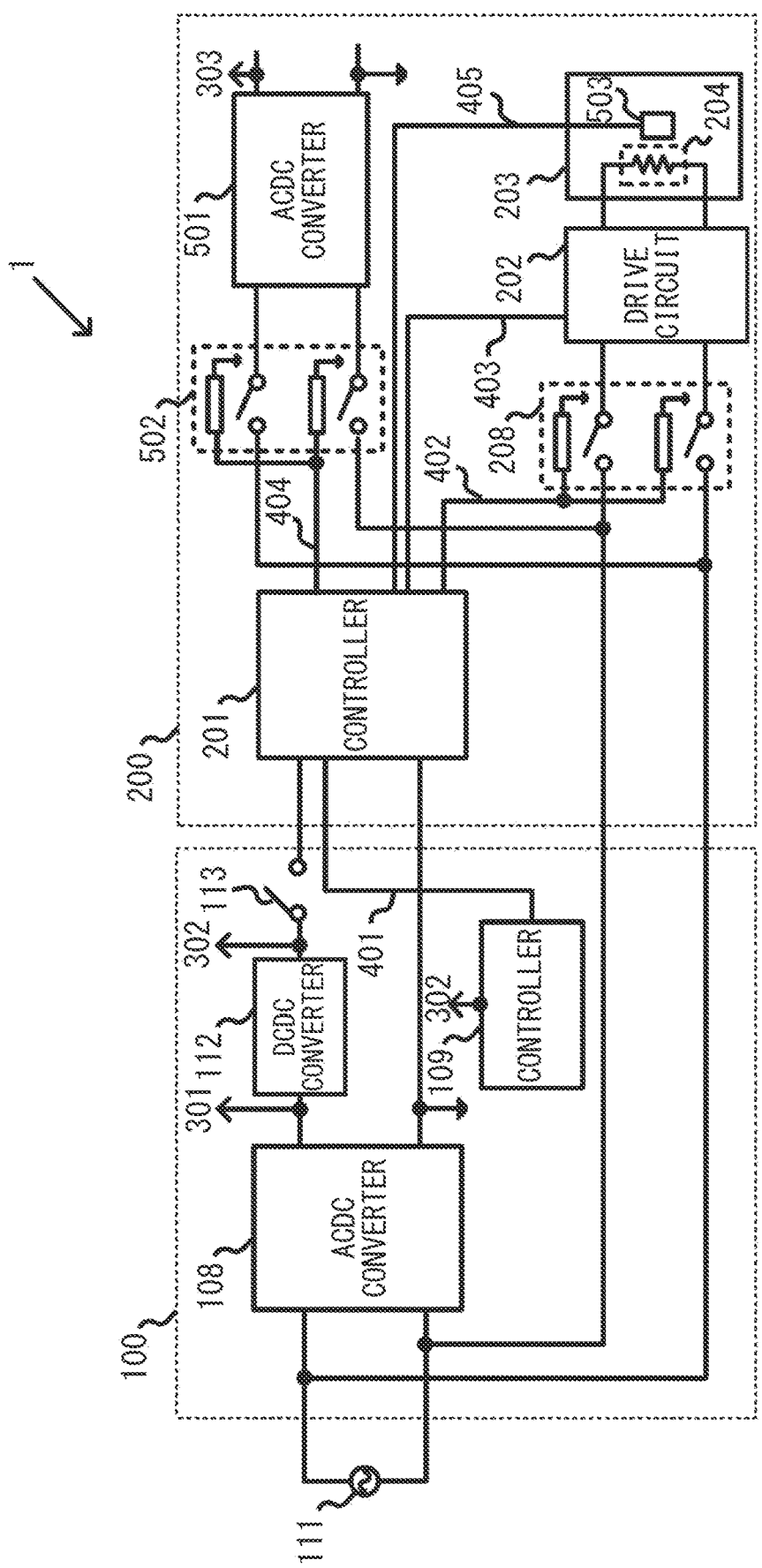
FIG. 3 is a circuit configuration view of the printer and the option of the embodiment 2.

FIG. 3 shows the circuit configuration view of the printer 100 and the option 200 of the embodiment 2. The option 200 of the embodiment 2 provided with a power source device 501 and a relay 502, a thermistor 503, a signal line 404 from the control portion 201 to a relay 502, and a signal line 405 from the thermistor 503 to the control portion 201. The power source device 501 is a conversion portion which converts the AC voltage into the DC voltage. The AC voltage inputted into the option 200 is connected to the power source device 501 via the relay 502 using a separate path from the path to the relay 208. The control portion 201 sends a signal to the relay 502 via the signal line 404 and controls the conduction and non-conduction of the relay 502. In a case that the relay 502 is conductive, the AC voltage is inputted into the power source device 501. The relay 502 is a second switching portion which supplies the AC voltage to the power source device 501 in the conductive state and cuts off supply of the AC voltage to the power source device 501 in the non-conductive state.

The power source device 501 is, for example, an ACDC converter, and converts the inputted AC voltage into a DC voltage 303. The DC voltage 303 is supplied to a motor, etc. of a driving portion (not shown in FIG. 3) inside the option 200. The driving portion executes a feeding operation, etc. of the sheet P inside the option 200. The thermistor 503 is a detecting means to detect the temperature of the heater portion 204. The control portion 201 monitors the temperature detected by the thermistor 503 which has been inputted via the signal line 405. The control portion 201 controls the switching operation of the driving circuit portion 202 based on the temperature detected by the thermistor 503. Further, in a case that the thermistor 503 detects a temperature which deviates from a predetermined preset temperature range, the control portion 201 determines that an abnormal state has occurred in the heater portion 204 and causes the switching operation of the driving circuit portion 202 to stop while also causing the relay 208 to be in the non-conductive state. In this way, the control portion 201 controls to cause the relay 208 to be in the non-conductive state in a case in which the temperature of the heater portion 204 detected by the thermistor 503 deviates from a predetermined range. As a result, the control portion 201 executes a protective operation which stops power supply to the driving circuit portion 202 and the heater portion 204.

Here, the relay 502 may be eliminated in a case in which the path of the AC voltage to the power source device 501 is branched from the downstream side of the relay 208 and connected. However, the relay 208 becomes non-conductive when the temperature of the heater portion 204 is in an abnormal state, so the AC voltage will no longer be inputted into the power source device 501. As a result, the power source device 501 will also be stopped, so the operation of the motor, etc. of the driving portion inside the option 200 which had power supplied from the power source device 501 will also be stopped. That is, in a case that the temperature of the heater portion 204 is in an abnormal state during the print operation, the driving portion stops operation and the feeding operation of the sheet P is also stopped, causing a jam to occur wherein the sheet P is jammed inside the option 200.

In the embodiment 2, the relay 502 is provided separately from the relay 208, and the path of the AC voltage to the power source device 501 is branched from an upstream side of the relay 208 and connected via the relay 502. As a result, the relay 502 can maintain the conductive state even in a case in which the temperature of the heater portion 204 is in an abnormal state during the print operation and the relay 208 becomes non-conductive. As a result, the feeding operation of sheet P can be maintained and the sheet P can be discharged to the tray 207 even if an abnormality occurs in the heater portion 204. Therefore, jam processes, such as the user opening the jam processing door (not shown in FIG. 3) to process the sheet P which has stopped during feeding, etc., can be avoided so as to prevent the occurrence of unnecessary jam processes.

Similar to the driving circuit portion 202 in the embodiment 1, the standby power in a control circuit of a power control IC, etc., which controls the switching operation of the power source device 501, continues to be generated even when the switching operation of the power source device 501 is in a stopped state. Therefore, in addition to the relay 208, the relay 502 is caused to be non-conductive in the energy saving mode so as to cut off the supply itself of the AC voltage to the power source device 501. In the embodiment 2, the relay 502 is caused to be in the non-conductive state when the control portion 201 is shifted from the sleep mode to the energy saving mode so as to stop operation of the power source device 501. As a result, power consumption generated on the load side of the relay 502, including the standby power generated in the power source device 501, can also be reduced in the embodiment 2.

As described above, according to the embodiment 2, the relay 502 is provided separate from the relay 208 in a path wherein the AC voltage has been branched from the upstream side of the relay 208, so that the relay 502 maintains the conductive state even if the temperature of the heater portion 204 is in an abnormal state. As a result, jam processes that are unnecessary to the user can be prevented even if an abnormality occurs in the heater portion 204 during the print operation while suppressing power consumption in the energy saving mode.

Incidentally, in the embodiment 2, the relay 502 may be configured with a triac, etc. or another switch component. Further, the thermistor 503 may be configured with a temperature sensor which uses other semiconductors or resistors. Further, according to the embodiments 1 and 2, the AC voltage inputted from the AC source 111 includes plugs which connect the printer 100 and the option 200 to the outside of each device, and the AC source 111 is connected to each plug with an AC cable. In this way, the configuration may be such that the AC voltage is inputted inside the printer 100 and the option 200. Further, the AC voltage inputted into the option 200 from the AC source 111 may be configured such that the AC voltage branches inside the option 200 and supplies the AC voltage from the option 200 to the printer 100.

Further, in the embodiments 1 and 2, the option 200 was described as a discharge option device. However, it is not limited to this and may be, for example, a paper feed option device and a double-side option device, etc.

As described above, according to the embodiment 2, power consumption of the option device in the energy saving mode can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171412 filed on Oct. 20, 2021, which is hereby incorporated by reference herein in its entirety.

What is claimed is:

1. A device operating in a state connected to an image forming apparatus, the image forming apparatus being operable in a first mode in which a predetermined operation is executed and in a second mode of which power consumption is reduced rather than in the first mode, being configured to form an image onto a recording material, and being provided with a power source portion to which an Alternating Current (AC) voltage is supplied from an external power source and from which a Direct Current (DC) voltage generated from the AC voltage is output, the device comprising:
   an operating portion configured to operate by the AC voltage supplied from the external power source;
   a first switching portion configured to supply the AC voltage to the operating portion in a conductive state and to cut off supply of the AC voltage to the operating portion in a non-conductive state;
   a control portion configured to operate by the DC voltage generated from the AC voltage by the power source portion provided in the image forming apparatus;
   a heating portion configured to heat the recording material; and
   a detecting unit configured to detect a temperature of the heating portion,
   wherein the control portion controls to cause the first switching portion to be in the non-conductive state so as to stop operation of the operating portion when the image forming apparatus shifts from the first mode to the second mode,
   wherein the operating portion includes a drive circuit configured to drive the heating portion, and
   wherein the control portion controls to cause the first switching portion to be in the non-conductive state in a case in which the temperature of the heating portion detected by the detecting unit deviates from a predetermined range.

2. The device according to claim 1, further comprising:
   a conversion portion configured to convert the AC voltage into the DC voltage; and a second switching portion provided in a path of the AC voltage branched from an upstream side of the first switching portion and configured to supply the AC voltage to the conversion portion in a conductive state and to cut off supply of the AC voltage to the conversion portion in a non-conductive state, wherein the control portion controls to cause the conversion portion to be in the non-conductive state so as to stop operation of the conversion portion when the device shifts from the first mode to the second mode.

3. An image forming system comprising: an image forming apparatus configured to form an image onto a recording material; and a device operating in a state connected to the image forming apparatus, wherein the image forming apparatus is operable in a first mode in which a predetermined operation is executed and in a second mode of which power consumption is reduced rather than in the first mode, wherein the image forming apparatus includes a power source portion configured to generate a Direct Current (DC) voltage from an Alternating Current (AC) voltage supplied from an external power source, and wherein the device includes: an operating portion configured to operate by the AC voltage; a first switching portion configured to supply the AC voltage to the operating portion in a conductive state and to cut off supply of the AC voltage to the operating portion in a non-conductive state; and a control portion configured to operate by the DC voltage generated by the power source portion, wherein the control portion controls to cause the first switching portion to be in the non-conductive state so as to stop operation of the operating portion when the image forming apparatus shifts from the first mode to the second mode, wherein the device includes a heating portion configured to heat the recording material on which the image is formed by the image forming apparatus, and wherein the operating portion includes a drive circuit configured to drive the heating portion, wherein the device includes a detecting unit configured to detect a temperature of the heating portion, and wherein the control portion controls to cause the first switching portion to be in the non-conductive state in a case in which the temperature of the heating portion detected by the detecting unit deviates from a predetermined range.

4. The image forming system according to claim 3, wherein the device includes a conversion portion configured to convert the AC voltage into the DC voltage; and a second switching portion provided in a path of the AC voltage branched from an upstream side of the first switching portion and configured to supply the AC voltage to the conversion portion in a conductive state and to cut off supply of the AC voltage to the conversion portion in a non-conductive state, and wherein the control portion controls to cause the conversion portion to be in the non-conductive state so as to stop operation of the conversion portion when the device shifts from the first mode to the second mode.

5. The image forming system according to claim 3, wherein the image forming apparatus includes an image forming control portion configured to switch modes of the image forming apparatus, and wherein the image forming control portion is configured to switch the image forming apparatus to the first mode to execute a print operation for forming the image on the recording material and to switch the image forming apparatus to the second mode after a predetermined time elapses from the print operation is completed.

6. The image forming system according to claim 5, wherein the image forming apparatus includes a drive portion configured to operate by the DC voltage generated, and wherein the image forming control portion is configured to cut off supply of the DC voltage to the drive portion in a case in which the image forming apparatus is switched to the second mode.

7. The image forming system according to claim 5, wherein the image forming control portion is configured to cut off supply of the DC voltage to the control portion in a case in which the image forming apparatus is switched to the second mode.

8. The image forming system according to claim 5, further comprising a communication portion provided between the image forming control portion and the control portion, wherein the device is configured to be switched to the second mode in a case in which the communication portion notifies from the image forming control portion to the control portion that the image forming apparatus is switched to the second mode.

* * * * *